(12) United States Patent
Hines

(10) Patent No.: US 11,500,479 B2
(45) Date of Patent: Nov. 15, 2022

(54) FINGER-MOUNTED STYLUS FOR TOUCHSCREEN DEVICES

(71) Applicant: Kenton Gregory Hines, Victor, NY (US)

(72) Inventor: Kenton Gregory Hines, Victor, NY (US)

( * ) Notice: Subject to any disclaimer, the term of this patent is extended or adjusted under 35 U.S.C. 154(b) by 0 days.

(21) Appl. No.: 17/248,090

(22) Filed: Jan. 8, 2021

(65) Prior Publication Data

US 2022/0221947 A1 Jul. 14, 2022

(51) Int. Cl.
*G06F 3/0354* (2013.01)
*G06F 3/039* (2013.01)
*A44C 9/00* (2006.01)

(52) U.S. Cl.
CPC ........ *G06F 3/03545* (2013.01); *A44C 9/0053* (2013.01); *G06F 3/0393* (2019.05); *G06F 2203/0331* (2013.01)

(58) Field of Classification Search
CPC .............. G06F 3/03545; G06F 3/0393; G06F 2203/0331; A44C 9/0053
See application file for complete search history.

(56) References Cited

U.S. PATENT DOCUMENTS

| | | | |
|---|---|---|---|
| 3,075,498 A * | 1/1963 | Udcoff | ................... B43L 15/00 D19/135 |
| 5,853,210 A | 12/1998 | Robinson | |
| 6,249,277 B1 | 6/2001 | Varveris | |
| 6,533,480 B2 | 3/2003 | Schneider | |
| 9,352,462 B2 | 5/2016 | Laybourne | |
| 9,519,354 B2 | 12/2016 | Yano | |
| 9,751,221 B1 * | 9/2017 | Aylsworth | ................ B26B 1/04 |
| 9,880,647 B2 | 1/2018 | Askew | |
| 10,126,835 B2 * | 11/2018 | Trond | ..................... G06F 3/041 |
| 2001/0053306 A1 * | 12/2001 | Schneider | ............ B43K 23/012 401/8 |
| 2006/0221066 A1 | 10/2006 | Cascella | |
| 2007/0245454 A1 | 10/2007 | Eklund | |
| 2008/0210724 A1 * | 9/2008 | Geis | ........................ G06F 3/039 224/217 |
| 2009/0066658 A1 | 3/2009 | Earl | |
| 2010/0188326 A1 * | 7/2010 | Dines | ...................... G06F 3/014 345/156 |
| 2012/0170962 A1 * | 7/2012 | Nwapa-Jourdan | ... B43K 23/012 401/8 |
| 2013/0291281 A1 | 11/2013 | Lee et al. | |
| 2014/0078071 A1 | 3/2014 | Walsh et al. | |
| 2015/0091879 A1 | 4/2015 | Madsen | |
| 2016/0239083 A1 * | 8/2016 | Cheng | ..................... G06F 3/014 |
| 2018/0292900 A1 | 10/2018 | Mercado Saddler | |
| 2019/0113989 A1 | 4/2019 | Giese | |
| 2020/0079136 A1 * | 3/2020 | Kurani | ................. B43K 29/004 |

\* cited by examiner

*Primary Examiner* — Ariel A Balaoing
(74) *Attorney, Agent, or Firm* — Dunlap Bennett & Ludwig, PLLC

(57) ABSTRACT

A finger-mounted computer stylus is provided. The stylus is pivotable between an operative position extending forward past the middle knuckle along a backhand area and an inoperative position wherein the stylus does not extend forward past the middle knuckle. Magnets along the upper surface of a base and associated pivot arm removably secure the stylus in the operative and inoperative positions by way of a magnetic connection adapted to be disconnected with a snap of the wrist.

8 Claims, 4 Drawing Sheets

FINGER-MOUNTED STYLUS FOR TOUCHSCREEN DEVICES

BACKGROUND OF THE INVENTION

The present invention relates to computing styluses and, more particularly, a finger-mounted stylus for touchscreen devices adaptable for gloves.

Being able to use a touchscreen device while wearing gloves without a peripheral pen-type stylus would be a boon for enthusiasts of motorcycling, skiing, gardening and other active-sport enthusiasts, not to mention workers in fields and industries where gloves are common.

Trying to use a graphic user interface or touchscreen while wearing, for example, skiing gloves, is imprecise and not very useful. The thick fingers block view and have too broad of a contact area. Furthermore, depending on the activity, having a pen-type stylus on your person can range from impractical and inconvenient to dangerous.

Touchscreen compatible gloves do exist, but they are imprecise and are not tailored for specific activities, and even if they were they would be suboptimal for the underlying activity as compared to one's existing (preferred) gloves.

As can be seen, there is a need for a finger-mounted stylus for touchscreen devices, wherein the finger-mounted stylus is compatible and transferable to all gloves. As a result, a user with skiing gloves, motorcycle gloves, or gardening gloves, does not need to buy a stylus-providing glove for each activity; rather the user can continue to purchase the handwear of their preference/style/brand and add the present invention thereon.

The present invention provides a finger-mounting apparatus as well as a pivotable connection facilitating moving the stylus between an operative position and an inoperative position that is adjacent and parallel with the mounted finger, and so out of the way (not interfering with normal hand/finger functions), yet allowing users to have the stylus available in the operative position at all times with a flick of the wrist, and without removing the glove.

SUMMARY OF THE INVENTION

In one aspect of the present invention, a finger mounted computer stylus, having the following components: a base having an upper surface comprising: a pivot point; and at least one base magnetizable material; and a pivot arm extending between a connection point and a stylus point; and the connection point pivotably connected to the pivot point in such a way that the pivot arm is movable between a magnetically connected operative position and a magnetically connected inoperative connection by way of the magnetizable materials being adapted to magnetically disconnect by way of a snap of a wrist of a human wearer, wherein a magnetic strength of each magnetizable material is selected in such a way that the corollary magnetic disconnections are effectuated by way of a snap of a wrist of a human wearer. The strength of the magnetizable material being measured in measured in units millions of gauss oersted (MGOe), and in certain embodiments, the magnetizable material being grade N42—i.e., having a Maximum Energy Product of 42 MGOe.

In another aspect of the present invention, the finger mounted computer stylus, includes the following components: lower surface of the base providing a finger curvature dimensioned and adapted to confirm to a finger of the human wearer; a strap operatively associated with the base, wherein the strap is dimensioned and adapted to wrap around said finger so that the base is adjacent a backhand area of the human wearer; a pair of flanges along the upper surface, the pair of flanges supporting the pivot point above the upper surface, wherein the operative and inoperative positions are coplanar, and parallel with said finger, whereby snap-of-the-wrist movability is facilitated; and arm magnetizable material along the pivot arm, wherein the at least one base magnetizable material comprises a posterior location and an anterior location along the upper surface, and wherein the arm magnetizable material is disposed at a complementary posterior location and a complementary anterior location along the pivot arm, wherein the operative position the stylus point extends anteriorly beyond a middle knuckle of said finger, and wherein the inoperative position the stylus point does not extends anteriorly beyond said middle knuckle.

In yet another aspect of the present invention, the finger mounted computer stylus may include the following: a base having magnetizable material; and a stylus pivotably connected to the base in such a way that the stylus is movable between a magnetically connected operative position and a magnetically connected inoperative connection by way of the magnetizable material being adapted to magnetically disconnect from the stylus by way of a snap of a wrist of a human wearer. The finger mounted computer stylus, wherein the operative position the stylus point extends anteriorly beyond a middle knuckle of said finger, and wherein the inoperative position the stylus point does not extends anteriorly beyond said middle knuckle.

In yet another aspect of the present invention, the finger mounted computer stylus includes the following: a base having a pivot point; a pivot arm extending between a connection point and a stylus point; and the connection point pivotably connected to the pivot point in such a way that the pivot arm is movable between an operative position and an inoperative position, wherein the operative position the stylus point extends anteriorly beyond a middle knuckle of said finger, and wherein the inoperative position the stylus point does not extends anteriorly beyond said middle knuckle, and wherein a ball and socket catch or other mechanism removably secures the pivot arm in one or both of the operative and inoperative positions.

These and other features, aspects and advantages of the present invention will become better understood with reference to the following drawings, description and claims.

DETAILED DESCRIPTION OF THE INVENTION

Figure 1:
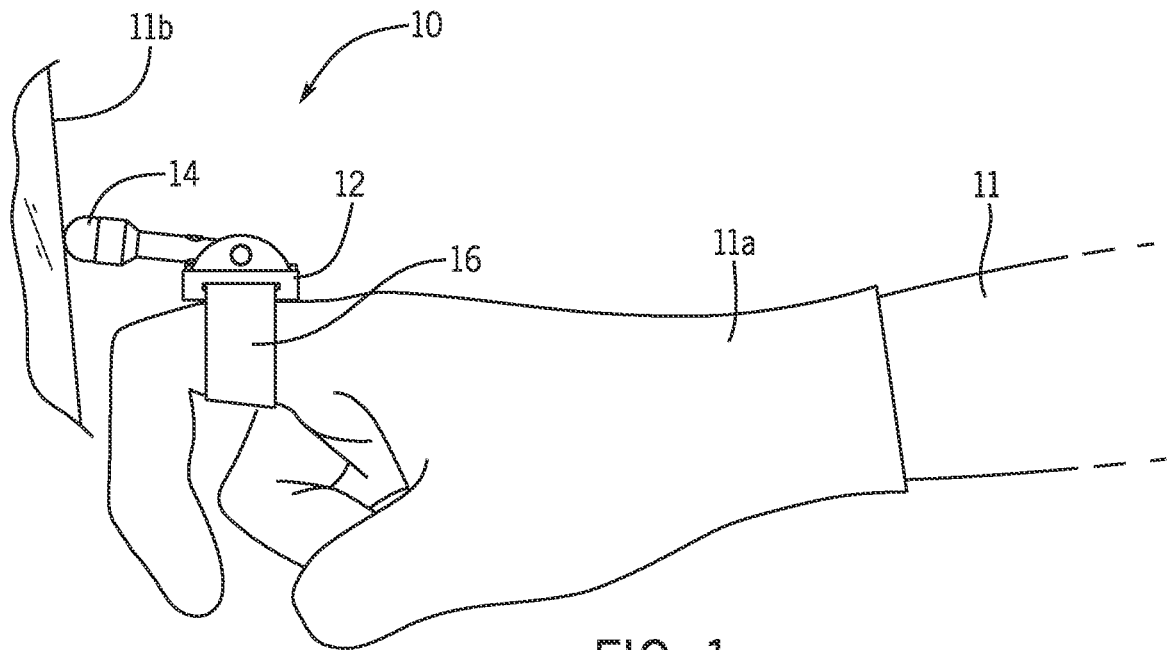
FIG. 1 is a side elevation view of an exemplary embodiment of the present invention shown in use, illustrating an operable mode.
Figure 2:
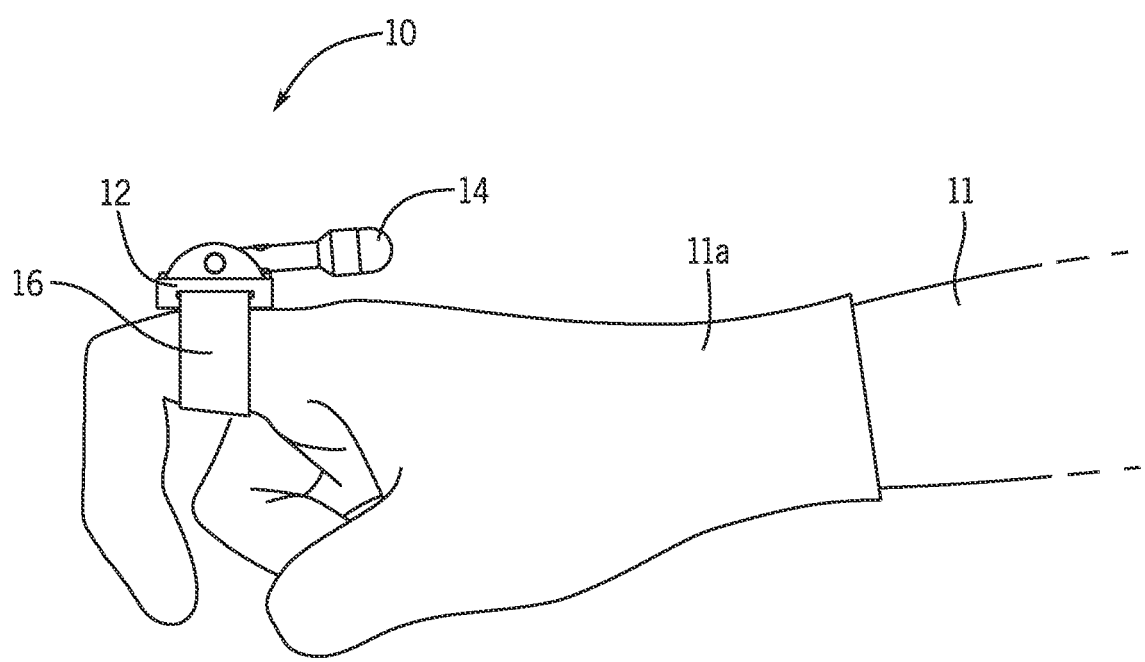
FIG. 2 is a side elevation view of an exemplary embodiment of the present invention shown in use, illustrating an inoperable mode.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a finger-mounted computer stylus. The stylus is pivotable between an operative position extending forward past the middle knuckle along a backhand area and an inoperative position wherein the stylus does not extend forward past the middle knuckle. Magnets along the upper surface of a base and associated pivot arm removably secure the stylus in the operative and inoperative positions by way of a magnetic connection adapted to be disconnected with a snap of the wrist.

Referring now to FIGS. 1 through 8, the present invention may include a finger-mounted computer stylus 10. The finger-mounted computer stylus 10 may include a base 12 dimensioned and adapted to engage a finger of a user 11; particularly, the proximal phalanx or middle phalanx portion of the finger of a human user. A bottom portion 40 of the base 12 may have a curvature dimensioned to engage the cylindrical shape of said proximal phalanx or middle phalanx portion of the human finger; specifically, the cross-sectional surface area of the bottom portion 40 may range from 0.05 to 0.50 inches squared, and its radius of curvature may be approximately 0.43 inches as the radius of curvature could range between 0.3 to 0.6 inches.

Longitudinal sidewalls of the base 12 may provide communicating slots 12c so that a strap 16 may slide therethrough relative to the base 12. The strap 16 may be dimensioned to wrap around said finger. The strap 16 may have modes of removably securing itself to said finger, such having first and second connectors 16a and 16b on opposing ends of the strap 16. In certain embodiments, the first and second connectors 16a and 16b may be hook portions and loop portions, respectively, or other modes of joining ends of the strap 16.

In a second embodiment 20, the strap 22 may be a D-ring 24. In a embodiment 30, the strap 32 may be elastic so as to be deformable to an expanded condition 34 from a biased condition 32.

Figure 3:
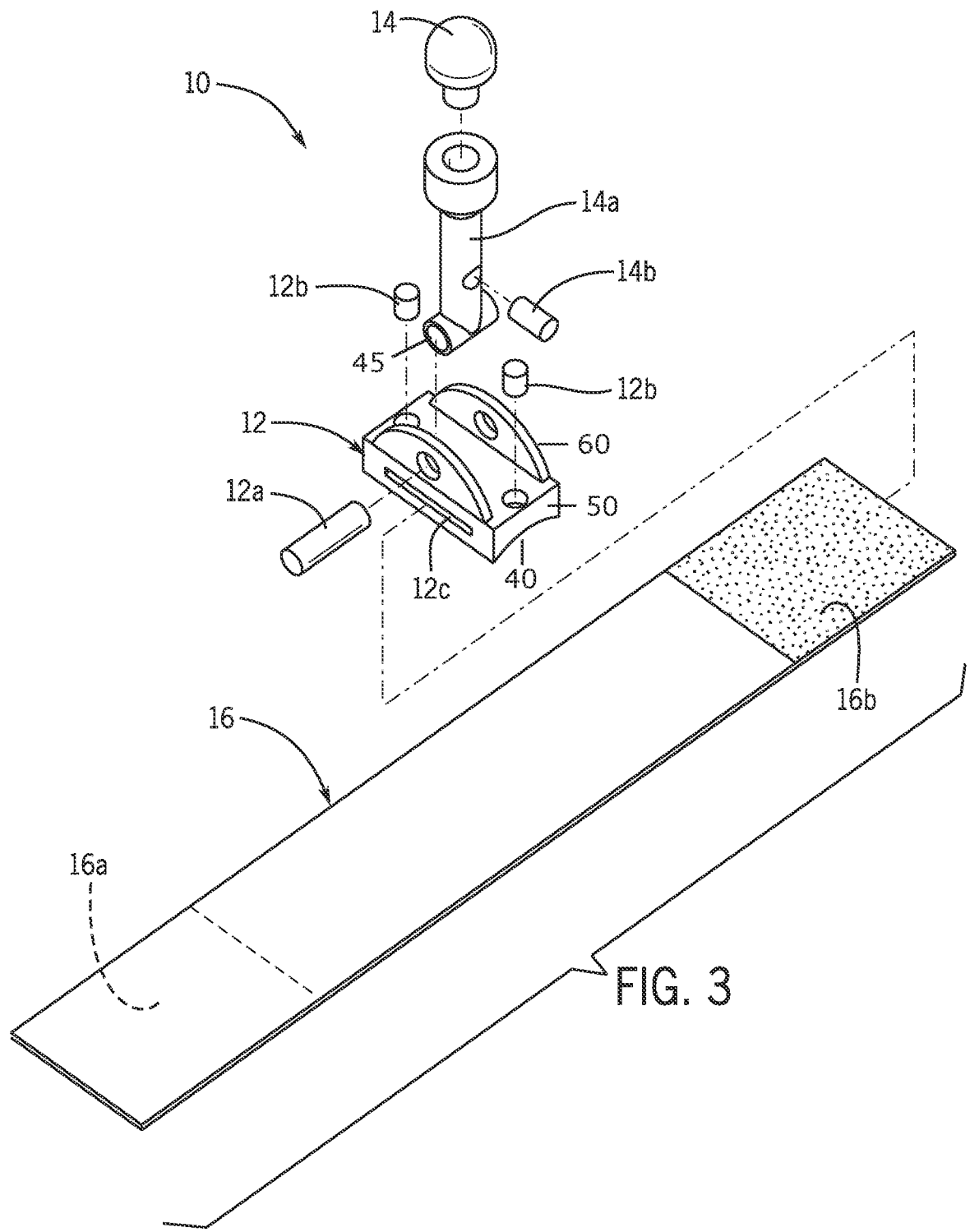
FIG. 3 is an exploded perspective view of an exemplary embodiment of the present invention.
Figure 4:
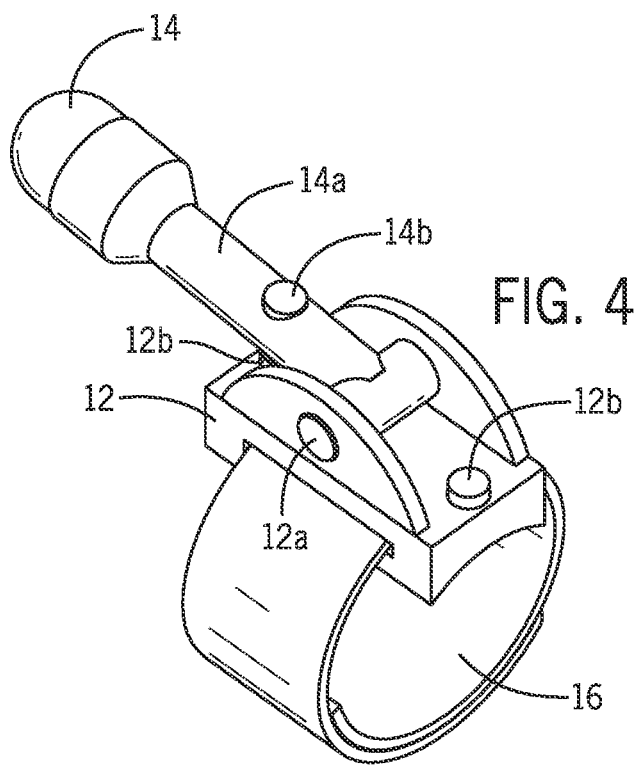
FIG. 4 is a rear perspective view of an exemplary embodiment of the present invention, illustrating the operable mode.
Figure 5:
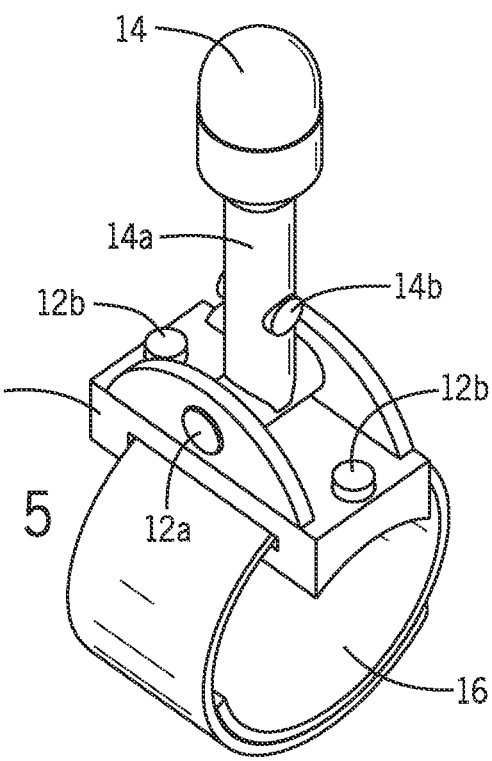
FIG. 5 is a rear perspective view of an exemplary embodiment of the present invention, illustrating a neutral mode.
Figure 6:
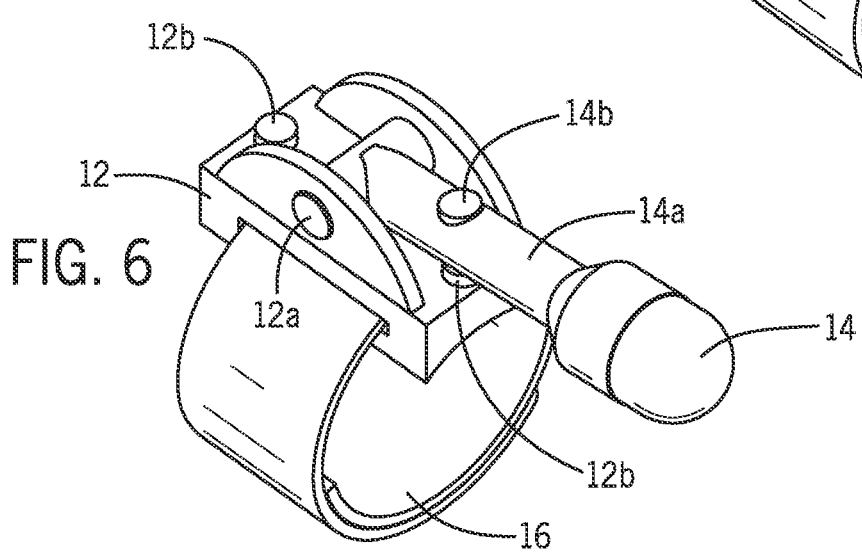
FIG. 6 is a rear perspective view of an exemplary embodiment of the present invention, illustrating the inoperable mode.
Figure 7:
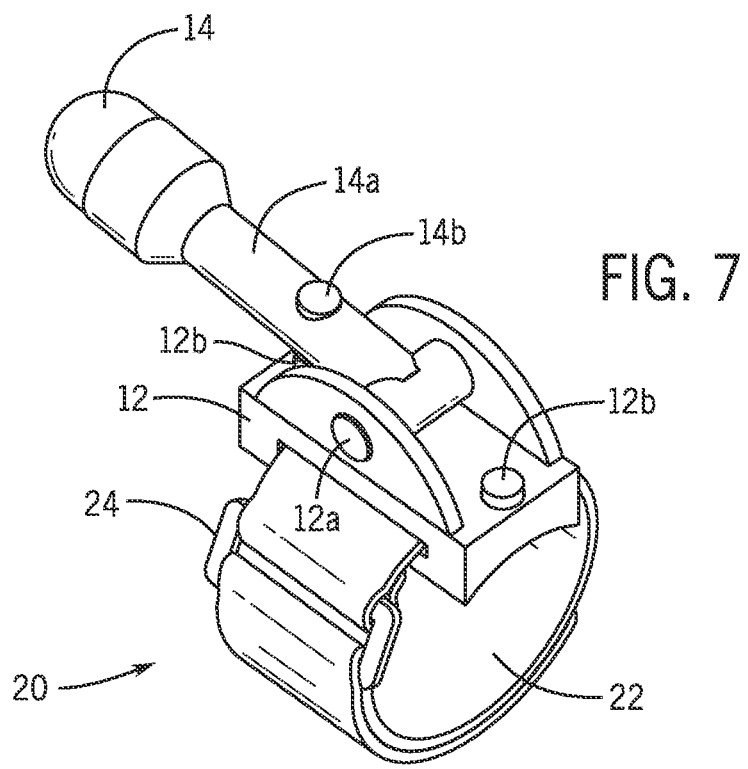
FIG. 7 is a rear perspective view of an exemplary embodiment of the present invention, illustrating the operable mode.
Figure 8:
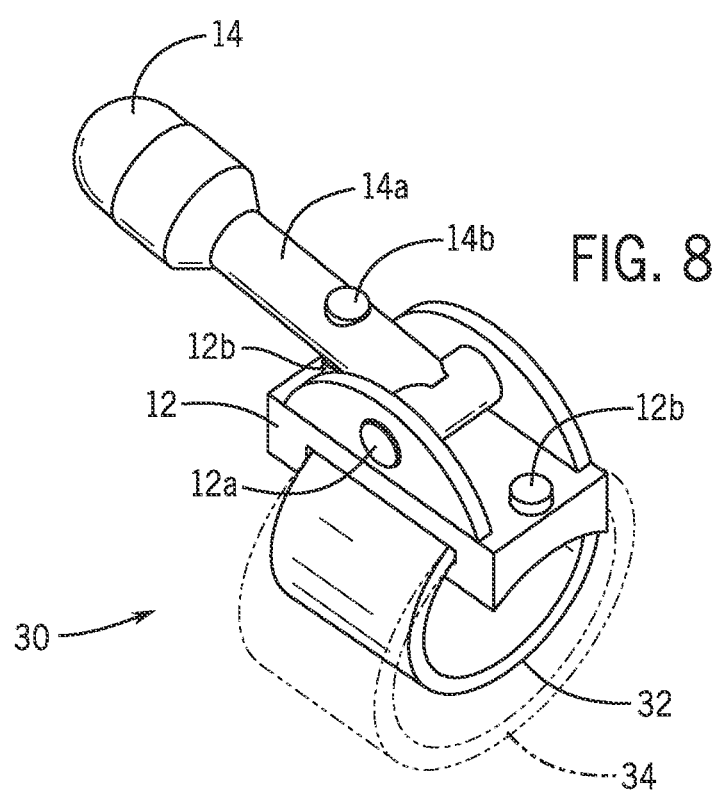
FIG. 8 is a rear perspective view of an exemplary embodiment of the present invention, illustrating the operable mode.

Along an upper surface of the base 12, at or adjacent to the anterior and posterior ends thereof, a base magnetizable material 12b may be provided (the anterior and/or posterior end indicated by reference numeral 50 in FIG. 3). In certain embodiments, the base magnetizable material 12b may be neodymium magnets or the like. A pivot point 12a may be provided along said upper surface. The pivot point 12a may be an axle. In certain embodiments, flanges 60 may be provided to facilitate and support the pivot point 12a.

A stylus 14 may be pivotably connected to the pivot point 12a by way of a pivot connection point 45 so that the stylus 14 can rotate at least 180-degrees about the pivot point 12a between an operative, anterior position and an inoperative, posterior position.

The pivot connection point 45 may be a tubular member for receiving the pivot point 12a. It is understood that the pivot connection point 45 may include other elements or other arrangement of elements (for example, the pivot connection point 45 may not be tubular, or the pivot point 12a may be connected to the flanges 60 as opposed to inserted through, as illustrated in the appended FIGS.) as long as the pivot connection point 45 functions as disclosed herein so that the pivot arm 14a pivots between the operative and inoperative positions.

The pivot connection point 45 may be at a proximal end of the pivot arm 14a, and the stylus 14 disposed at the distal end of the pivot arm 14a. An arm magnetizable material 14b may be associated with the pivot arm 14a between its distal and proximal ends so that in the operative position, the arm magnetizable material 14b magnetically engages the anterior located base magnetizable material 12b and in the inoperative position, the arm magnetizable material 14b magnetically engages the posterior located base magnetizable material 12b. There may be one or more neutral positions wherein the magnetizable materials 14b and 12b are not engaged.

The strength of the magnetizable materials 14b and 12b is predetermined so that the magnetic connection can be broken with a snap of a wearer's wrist. In other words, with a snap of the wearer's wrist or possibly a flick of their mounted finger, the wearer of the present invention may move the stylus 14 from a magnetically secured operative position to the magnetically connected inoperative position when not in use so that the hand can function as it normally would, unobstructed.

Therefore, when assembled properly and mounted to a finger (gloved 11b or ungloved), the device will act as an extension of the hand and allow the user to operate a touchscreen surface 11b without removal of their glove 11a or use of a peripheral device.

A method of using the present invention may include the following. The finger-mounted computer stylus 10 disclosed above may be provided, and the user would mount it directly to the proximal phalanx or middle phalanx portion of their finger or to an associated finger stall of a glove 11a, utilizing the strap 16 or 22 or elastic strap to secure. When the user wants to input through a touchscreen 11b, without removing their glove they move the stylus 14 to the operative position with a flick of their wrist, breaking and then making a magnetic connection between the arm magnetizable material with the posterior and then anterior base magnetizable material, respectively. The user can then use the touchscreen function of their device. Subsequently, with another snap of the wrist, the user can move the stylus 14 to the inoperative position, where the magnetizable materials form a temporary connection. In the inoperative position the stylus 14 is out of the way, and so the user can go about their normal business. This is helpful in scenarios like operating a vehicle where distance between an upper portion of the wearer's hand between the middle knuckle area and the tips of their fingers and the vehicular equipment, say the handlebars, is limited. Or, skiing, where one does not want to expose fingers to cold, garden work where you would not want dirty/muddy gloves in contact with phone or other gloved scenarios. Especially useful if one has gloves for a specific application that you wish to continue using and do not want to have to buy only "touchscreen compatible gloves".

It should be understood, of course, that the foregoing relates to exemplary embodiments of the invention and that modifications may be made without departing from the spirit and scope of the invention as set forth in the following claims.

What is claimed is:

1. A finger mounted computer stylus, comprising:
    a base having an upper surface extending between an anterior end and a posterior end, the upper surface comprising:
        an anterior base engagement point adjacent the anterior end; and
        a posterior base engagement point adjacent the posterior end;
    a pivot point provided by the base, wherein the pivot point is between and spaced apart from the anterior and posterior base engagement points;
    a pivot arm extending between a connection point and a stylus point, the pivot arm comprising:
        an anterior arm engagement point disposed between the connection point and the stylus point;
        a posterior arm engagement point disposed diametrically opposed relative to the anterior arm engagement point; and
        the connection point pivotably connected to the pivot point in such a way that the pivot arm is movable between an operative locked engagement and an inoperative locked engagement by way of the anterior and posterior engagement points, respectively.

2. The finger mounted computer stylus of claim 1, further comprising a lower surface of the base providing a finger curvature dimensioned and adapted to confirm to a finger of a human wearer.

3. The finger mounted computer stylus of claim 2, further comprising a strap operatively associated with the base, wherein the strap is dimensioned and adapted to wrap around said finger so that the base is adjacent a backhand area of the human wearer.

4. The finger mounted computer stylus of claim 3, further comprising a pair of flanges along the upper surface, the pair of flanges supporting the connection point above the upper surface.

5. The finger mounted computer stylus of claim 4, wherein said engagement points comprise magnetic material.

6. The finger mounted computer stylus of claim 5, wherein the locked engagements are magnetic connections.

7. The finger mounted computer stylus of claim 6, wherein in the operative locked engagement position the stylus point extends anteriorly beyond a middle knuckle of said finger, and wherein in the inoperative locked engagement the stylus point does not extend anteriorly beyond said middle knuckle.

8. The finger mounted computer stylus of claim 6, wherein a magnetic strength of each magnetic material is selected in such a way that the corollary magnetic disconnections are effectuated by way of a snap of a wrist of a human wearer.

* * * * *